H. L. SCHENCK.
CHANGEABLE SPEED GEAR MECHANISM.
APPLICATION FILED APR. 7, 1915.
1,156,102.
Patented Oct. 12, 1915.
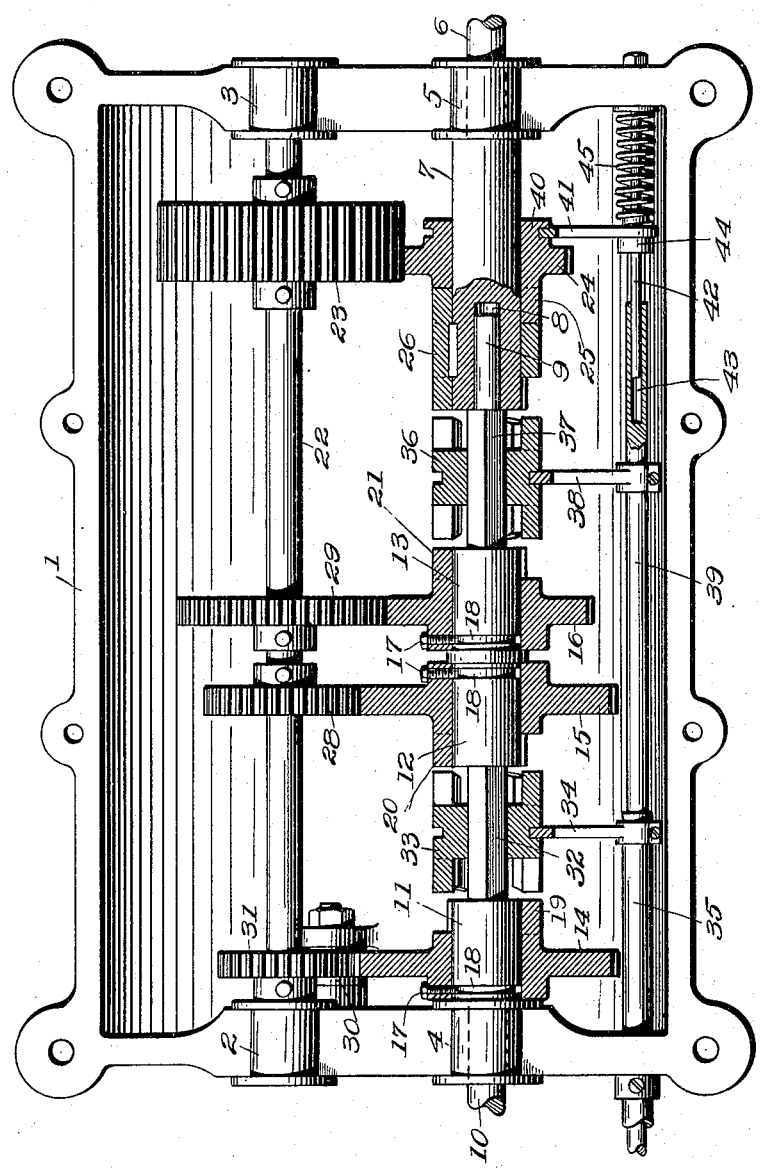
Inventor.
Henry L. Schenck
LaPorte, Bean & Graham
Attys.

UNITED STATES PATENT OFFICE.

HENRY L. SCHENCK, OF DECATUR, ILLINOIS.

CHANGEABLE-SPEED GEAR MECHANISM.

1,156,102. Specification of Letters Patent. Patented Oct. 12, 1915.

Application filed April 7, 1915. Serial No. 19,652.

*To all whom it may concern:*

Be it known that I, HENRY L. SCHENCK, a resident of Decatur, county of Macon, and State of Illinois, have invented certain new and useful Improvements in Changeable-Speed Gear Mechanism, of which the following is a specification.

This invention relates to certain new and useful improvements in changeable speed-gear transmission mechanism, the object being to provide mechanism for changing the speed of the engine in which the mechanism is used in connection, without shifting the gears, thereby reducing the wear and providing a noiseless transmission.

A further object of the invention is to provide a transmission gear so constructed that the gears are always in mesh, whereby any one of the gears can be brought into operative position so that the operator can instantaneously select any one of the gears in order to obtain the desired speed or reverse.

A still further object of the invention is to provide a mechanism which is so constructed that direct drive through the center of all gears can be obtained with all the gears in mesh.

Other and further objects and advantages of the invention will be hereinafter set forth and the novel features thereof defined by the appended claims.

This invention is an improvement upon my earlier invention, patented April 28, 1914, bearing No. 1,094,751.

In the drawings:—the figure represents a view showing the parts in section.

In the drawing 1 indicates a casing which may be formed of any design or configuration, but herein shown rectangular in shape, having bearings 2, 3, 4 and 5 at its opposite ends, which may be roll or ball, as desired. Mounted within the bearing 5 is a driving shaft 6 having an enlarged portion 7, the end thereof being provided with a longitudinal bore forming a tubular portion 8 in which the reduced circular portion 9 of a driven shaft 10 is revolubly mounted, the opposite end of said shaft being mounted in the bearing 4.

The driven shaft 10 is provided with enlarged circular portions 11, 12 and 13 on which are loosely mounted gear wheels 14, 15 and 16, said wheels being positioned thereon by set screws 17 traveling in annular grooves 18 formed in the enlarged portions of the driven shaft as clearly shown in the figure. The gears 14, 15 and 16 are provided with hub portions having clutch members 19, 20 and 21; and the gear 14 forms a reverse gear; the gear 15, a low-speed gear; and the gear 16 an intermediate speed gear, as will be hereinafter fully described.

Mounted within the bearings 2 and 3 is a countershaft 22 on which is fixed adjacent one end, a gear 23 which is driven by a pinion 24 loosely mounted on the enlarged portion 7 of the drive shaft 6; said pinion being provided with a clutch member 25 adapted to be normally held in operative engagement with a double clutch member 26 fixed on the drive shaft 6.

The counter shaft 22 is provided with a gear 28 meshing with the low-speed gear 15 and a gear 29 meshing with the intermediate speed gear 16, which gears are always in mesh and it will be seen that when the gear 23 on the counter shaft 22 is driven by the pinion 24, the gears 15 and 16 will be driven in the same direction as the pinion 24. Meshing with the reverse gear 14 is an idler gear 30 suitably mounted in the casing and which is driven by a gear 31 fixed on the counter shaft 22 in order to reverse the direction of rotation of the reverse gear.

For locking either of the reverse or low-speed gears to the driven shaft, I provide the latter with a reduced square portion 32 on which is slidably mounted a double clutch member 33 controlled by a shifting arm 34 arranged upon the shifting rod 35, and it will be seen that when the rod is shifted longitudinally in one direction, the clutch member 33 will be thrown into operative engagement with the reverse gear 14.

In order to obtain a direct drive or high speed drive, I provide means for directly connecting the drive shaft 10 and the driven shaft 6 which comprises a double clutch member 36 arranged upon the square portion 37 of the driven shaft 10, and controlled by a shifting arm 38 mounted upon a shifting rod 39.

The pinion 24 has the hub portion 40 which is grooved, as shown, to receive the shifting arm 41 which is slidably mounted on rod 42, said rod being secured to the casing and slidably fitting in the recess or socket 43 in the end of rod 39. The arm 41 has the hub or sleeve 44 against which the spring 45 bears on one side. The end of rod 39 engages the other side of said hub or sleeve 44 to move the pinion 24 to the right and break the connection between clutch parts 25 and 26; and it will be seen that as this is thrown out of operative engagement the clutch 36 is thrown into operative engagement with the clutch 26, whereby the driving and driven shafts are connected so as to obtain a direct drive. By shifting the clutch 36 in an opposite direction, it will be thrown into engagement with the clutch portion 21 of the intermediate speed gear 16, so as to drive the driven shaft at an intermediate speed. The spring 45 normally holds the parts in the position shown with the clutch members 25 and 26 in engagement.

In order to disconnect all the gears and clutches it is only necessary to move the clutch member 36 longitudinally upon the square portion 37 into such a position as to throw the clutch 25 of the pinion 24 out of mesh with the double clutch 26 without throwing the clutch 36 into engagement with the clutch 26 and the drive shaft will be allowed to rotate freely.

It is to be noted that the rod 39 telescopes within rod 35, this being for the purpose of rendering the structure compact. The rods have suitable operative handles or connections.

While I have shown and described a peculiar construction of clutch members, it will of course be understood that any form of clutch can be used and that the manner of mounting the same may be varied without departing from the spirit of my invention. The operation of the mechanism is as follows:

Assuming that the gears are in position as shown in the drawing, the driving shaft will drive the pinion 24 which in turn drives the gear 23 of the counter-shaft, causing the gears carried thereby to revolve the reverse gear, low-speed gear and intermediate speed gear carried by the driven shaft.

By operating the clutch member 33 in one direction, the low-speed gear will be thrown into operation and by operating the clutch in a reverse direction, the reverse gear will be thrown into operation. By operating the clutch member 36 so as to move toward the pinion 24, the pinion will be moved longitudinally upon the drive shaft, and in order to provide means for preventing the pinion from being thrown out of mesh with the gear 23, the width of the gear 23 is three times as great as the pinion, which is sufficient to allow the pinion to move the desired distance so that the clutch 36 will be thrown into operative engagement with the clutch 26 so as to unite the driven and drive shaft, in order to obtain the high speed. When the clutch 36 is shifted in an opposite direction, it is thrown into operative engagement with the intermediate speed gear, causing the driven shaft to rotate, and as shown in the drawing, the gears carried by the counter shaft are of different sizes in order to obtain the desired speed. It will be seen that I have provided a selective speed changing gearing in which any of the speed gears can be thrown into and out of operation without throwing the gears out of mesh. I have also provided means for obtaining a direct drive through the center of all gears when at high speed.

What I claim is:

1. In a speed change mechanism and in combination, a driving shaft, a driven shaft in alinement therewith, a counter shaft parallel to said driving and driven shafts, a plurality of meshing gears on said shafts whereby various speeds including reverse, are provided, the gears on the driven shaft being loosely mounted thereon but prevented from longitudinal movement relative thereto, the gear on the driving shaft being slidable thereon, the gear on the counter shaft with which said sliding gear meshes, being greater in width, said driven shaft having a plurality of double clutch members slidably arranged thereon to rotate therewith, said driving shaft having a double clutch member fixed thereto adapted to engage and drive said sliding gear in one position, said slidable clutch members on the driven shaft being adapted to be moved to connect said gears to said driven shaft to rotate said driven shaft and one of said double clutch members on said driven shaft being adapted to engage said fixed clutch member on the drive shaft so as to provide a direct drive, a rod for operating the first one of said slidable double clutch members, a second rod telescopically mounted in said first mentioned rod to operate said second double clutch member, said second rod having a socket in its end, an additional rod slidably mounted in said socket, an arm connected to said sliding gear on said driving shaft and mounted on said additional rod, resilient means bearing against said arm for normally holding the said sliding gear in engagement with said fixed double clutch on said drive shaft, the end of said second rod being adapted to engage said arm to move said sliding gear out of engagement with said fixed clutch on said driving shaft, when said second sliding double clutch on the driven shaft is moved into engagement with the said fixed double clutch on the driving shaft.

2. In a mechanism of the character described, and in combination, a driving shaft, and a driven shaft in alinement therewith, a counter shaft, meshing gears on said shafts whereby various speeds may be provided, a double clutch member fixed on said driving shaft, the gear on said driving shaft being movable thereon and having a clutch face, the gear on said counter shaft with which said movable gear meshes being of greater width, double clutch members mounted to slide on said driven shaft to connect said gears thereto, one of said slidable clutch members being adapted to engage said fixed clutch member, to provide a direct drive, a rod for actuating said slidable clutch member and connections between said rod and said movable gear to move said gear, including means for normally holding said gear in engagement with said fixed clutch member, said connections being so arranged that when said rod is actuated to place said slidable clutch member in engagement with said fixed clutch member, the operative connection between said movable gear and said fixed clutch member is broken; and a rod for actuating said other slidable double clutch member, said first mentioned rod extending through said second mentioned rod.

3. In a mechanism of the character described, and in combination, a driving shaft, and a driven shaft in alinement therewith, a counter shaft, meshing gears on said shafts whereby various speeds may be provided, a double clutch member fixed on said driving shaft, the gear on said driving shaft being movable thereon and having a clutch face, the gear on said counter shaft with which said movable gear meshes being of greater width, double clutch members mounted to slide on said driven shaft to connect said gears thereto, one of said slidable clutch members being adapted to engage said fixed clutch member, a rod for actuating said last connections to move said movable gear, a rod for actuating said other slidable double clutch member, said first mentioned rod extending through said second mentioned rod, said second mentioned rod having a socket formed in the end thereof, a rod slidably positioned in said socketed end, a connection between said movable gear and said last mentioned rod, means for normally holding said connection so that said movable gear is in engagement with said fixed clutch, the end of said second mentioned rod being adapted to engage said connection so as to move said movable gear and break the connection with said fixed clutch.

4. In a mechanism of the character described, and in combination, a driving shaft, and a driven shaft in alinement therewith, a counter shaft, meshing gears on said shafts whereby various speeds may be provided, a double clutch member fixed on said driving shaft, the gear on said driving shaft being movable thereon and having a clutch face, the gear on said counter shaft with which said movable gear meshes being of greater width, double clutch members mounted to slide on said driven shaft to connect said gears thereto, one of said slidable clutch members being adapted to engage said fixed clutch member, a rod for actuating said last mentioned slidable double clutch member, another rod for actuating said other slidable double clutch member, said first mentioned rod extending through said second mentioned rod, said first mentioned rod having a socket provided in the end thereof, an additional rod slidably positioned in said socketed end, a shifting arm connected to said movable gear and slidably mounted on said additional rod, said shifting arm being adapted to be engaged by the end of said first mentioned rod, whereby the movable gear is moved from engagement with the fixed clutch, and resilient means bearing against said shifting arm to normally hold said movable gear in engagement with said fixed clutch.

HENRY L. SCHENCK.

Copies of this patent may be obtained for five cents each, by addressing the "Commissioner of Patents, Washington, D. C."